US009443396B2

(12) United States Patent
Babineau et al.

(10) Patent No.: US 9,443,396 B2
(45) Date of Patent: Sep. 13, 2016

(54) SOCIAL MEDIA LOTTERY GAME WITH PLAYER PROFILE WAGERING SELECTIONS

(71) Applicant: GTECH Corporation, Providence, RI (US)

(72) Inventors: Ronald Babineau, Charlestown, RI (US); Amy Morin, North Providence, RI (US); Todd Nash, Henderson, NV (US); Kenneth Perry, Westerly, RI (US); Nicolas Seccatore, Santiago (CL); Christopher Simonelli, Providence, RI (US); John Taylor, Las Vegas, NV (US); Jess Wright, Pierre, SD (US)

(73) Assignee: IGT GLOBAL SOLUTIONS CORPORATION, Providence, RI (US)

( * ) Notice: Subject to any disclaimer, the term of this patent is extended or adjusted under 35 U.S.C. 154(b) by 0 days.

(21) Appl. No.: 13/837,338

(22) Filed: Mar. 15, 2013

(65) Prior Publication Data

US 2014/0087814 A1 Mar. 27, 2014

Related U.S. Application Data

(60) Provisional application No. 61/705,762, filed on Sep. 26, 2012.

(51) Int. Cl.
*A63F 13/00* (2014.01)
*G07F 17/32* (2006.01)

(52) U.S. Cl.
CPC ........... *G07F 17/329* (2013.01); *G07F 17/326* (2013.01)

(58) Field of Classification Search
CPC ............. G06Q 30/02; G06Q 30/0209; G06Q 30/0212; G06Q 30/0222; G06Q 30/0226; G06Q 30/0239; G06Q 30/0277; G06Q 30/0641; G06Q 20/04; G06Q 20/346; G06Q 20/363; G06Q 50/34; H04M 11/00; H04M 2201/40; H04M 2203/1066; H04M 2203/2016; H04M 2242/22; H04M 3/36; H04M 3/38; H04M 3/42; H04M 3/42042; H04M 3/42059; H04M 3/436; H04M 3/46; H04M 3/493; H04M 3/51; H04Q 2213/13034; H04Q 2213/13072; H04Q 2213/1309; H04Q 2213/13091; H04Q 2213/13093; H04Q 2213/13095; H04Q 2213/13096; H04Q 2213/13097; H04Q 2213/13103; H04Q 2213/13106; H04Q 2213/13107; A63F 3/081; A63F 2001/008; A63F 13/12; A63F 1/00; A63F 2003/086; A63F 2300/50; A63F 2003/0017; A63F 2300/532; A63F 3/0645; A63F 13/00; A63F 2007/4031; A63F 2009/242; A63F 2011/0016; G07F 17/32; G07F 17/3244; G07F 17/3258; G07F 17/3239; G07F 17/3227; G07F 17/3251; G07F 17/323; G07F 17/3234; G07F 17/3255; G07F 17/3262; G07F 17/34; G07F 17/3267; G07F 17/3223; G07F 17/324
See application file for complete search history.

(56) References Cited

U.S. PATENT DOCUMENTS 6,015,346 A * 1/2000 Bennett .................. G07F 17/32 273/138.2
6,702,668 B2 * 3/2004 Banyai .................. A63F 3/081 273/274

(Continued)

*Primary Examiner* — Sunit Pandya
(74) *Attorney, Agent, or Firm* — Williams Mullen PC; Thomas F. Bergert

(57) ABSTRACT

The present invention combines aspects of social media with traditional lottery games. In one aspect, the present invention provides lottery game for drawing-based and instant-based games, where the numbers or icons that are traditionally used are replaced by player profiles.

12 Claims, 4 Drawing Sheets

(56) References Cited

U.S. PATENT DOCUMENTS 7,104,887 B2 * 9/2006 Hughes ................. G07F 17/329 463/17
7,392,285 B2 6/2008 Philyaw
7,477,954 B2 * 1/2009 LaNeve ................. G06Q 50/34 700/91
7,620,558 B2 11/2009 Fujita et al.
7,837,554 B2 * 11/2010 Kaminkow ............. G07F 17/32 273/138.1
8,235,820 B2 * 8/2012 Fine .................... G07F 17/3206 463/42
8,641,501 B2 * 2/2014 Allen ................. G06Q 30/0214 463/16
8,827,794 B2 9/2014 Skatter et al.
8,827,813 B2 9/2014 Lemay et al.
8,845,418 B2 9/2014 Walker et al.
8,851,982 B2 10/2014 Englman et al.
8,864,564 B2 10/2014 Oberberger et al.
8,864,569 B2 10/2014 Baerlocher et al.
8,915,781 B2 12/2014 Fine et al.
8,926,423 B2 1/2015 Filipour et al.
2006/0063583 A1 * 3/2006 Thomas .................. G07F 17/32 463/20
2007/0066382 A1 * 3/2007 Penrice ................... G07F 17/32 463/16
2007/0077981 A1 4/2007 Hungate et al.
2008/0102957 A1 5/2008 Burman et al.
2009/0117989 A1 5/2009 Arezina et al.
2011/0275428 A1 * 11/2011 Forman ................... G07F 17/34 463/16
2012/0036189 A1 2/2012 Sadamoto
2012/0084127 A1 4/2012 Nkrumah
2012/0122538 A1 5/2012 Pollard et al.
2012/0202573 A1 8/2012 Stanek et al.
2014/0087813 A1 * 3/2014 DeLise ................. G07F 17/329 463/17

* cited by examiner

SOCIAL MEDIA LOTTERY GAME WITH PLAYER PROFILE WAGERING SELECTIONS

FIELD OF THE INVENTION

The present invention relates to lottery games, and more particularly to lottery games that can involve social media.

BACKGROUND AND SUMMARY OF THE INVENTION

Lottery ticket games are known and are provided in different formats, including instant-win type games and online or drawing-based games. With an instant ticket game, a player typically scratches one or more places on a ticket to determine if he or she is a winner. With drawing-based games, a player typically selects several numbers from a pool of numbers, and a lottery drawing of numbers (such as from a bin of ping pong balls, for example) is conducted later to determine whether there are any winners. Lottery tickets can be physical tickets purchased at retailers or virtual tickets purchased and played online.

Social media is a separate and more recent phenomenon, whereby individuals can interact in a variety of ways online through social media-related web systems, such as Facebook™, LinkedIn™, Twitter™, MySpace™ and other sites. Various functions are available at these sites, with a typical theme being the sharing of various types of information with a group or network of known friends and contacts.

The present invention combines aspects of social media with traditional lottery games. In one aspect, the present invention provides a system and method for new lottery games, where the numbers or icons that are traditionally used are replaced by player profiles.

DETAILED DESCRIPTION OF EMBODIMENTS OF THE PRESENT INVENTION

Figure 1:
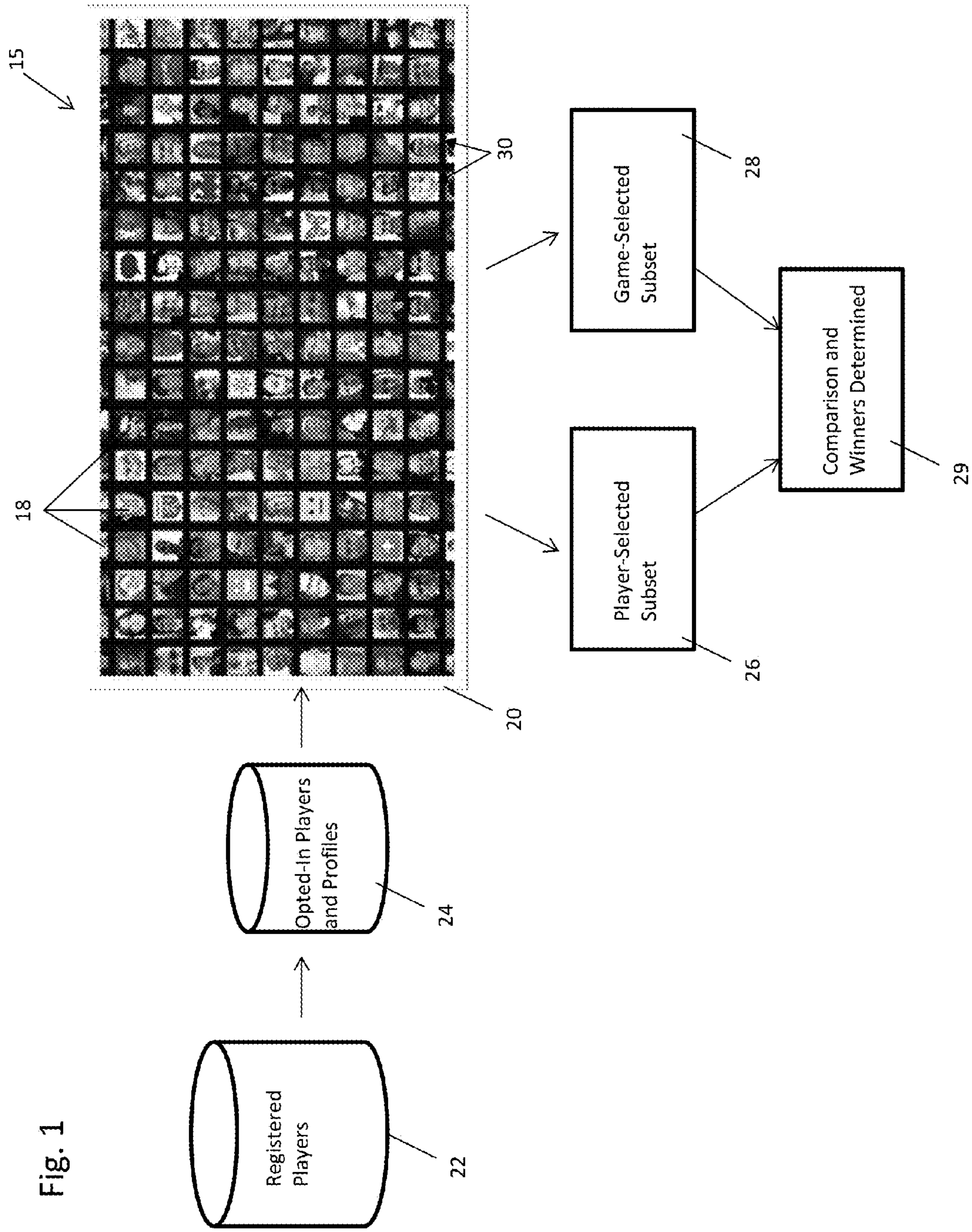
FIG. 1 shows a schematic diagram illustrating the selection of a game matrix for a ticket game and subsequent play of the game according to one embodiment of the present invention.
Figure 2:
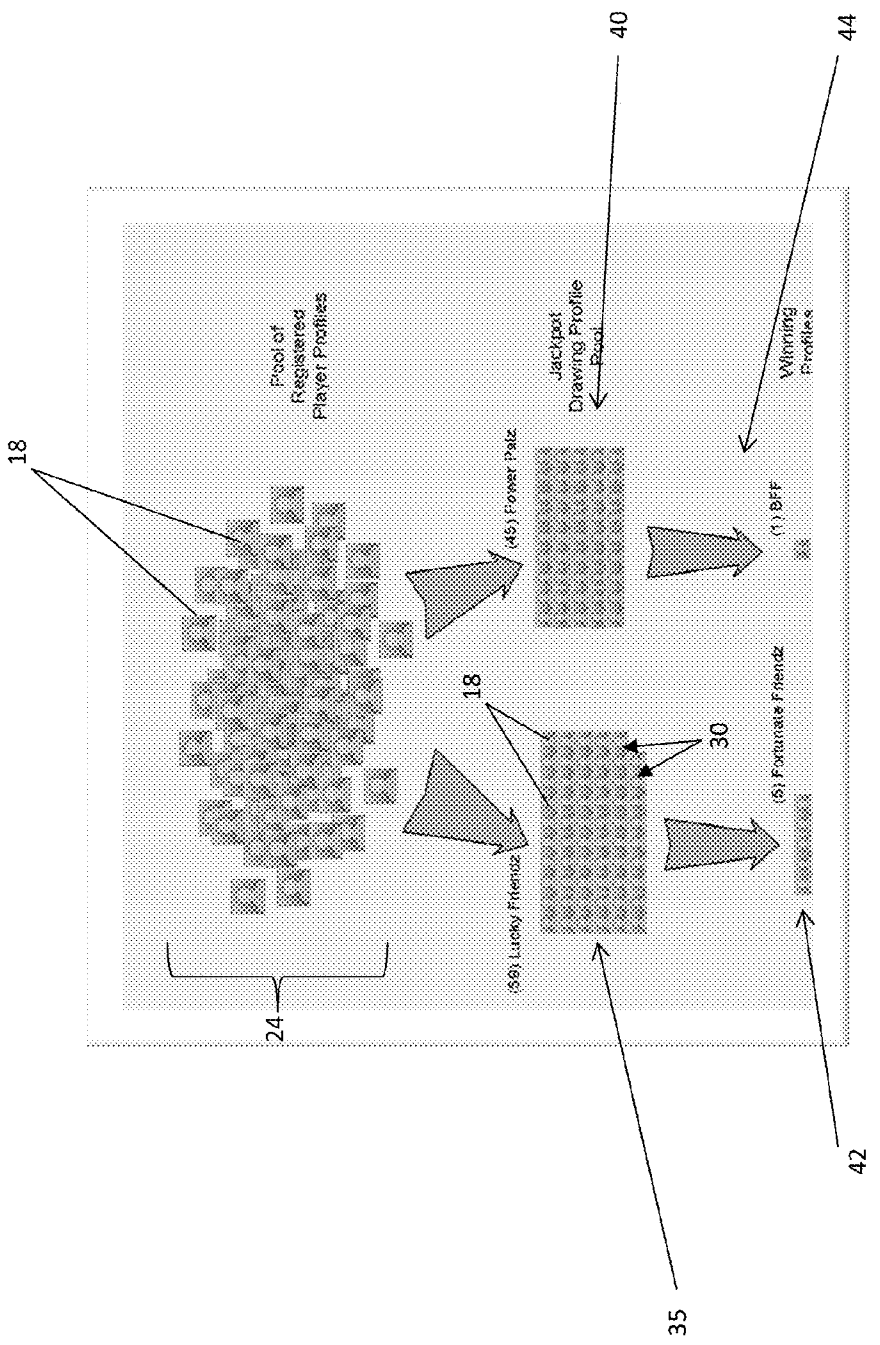
FIG. 2 illustrates a lottery ticket game and game flow in accordance with one embodiment of a drawing-based game according to the present invention.
Figure 3:
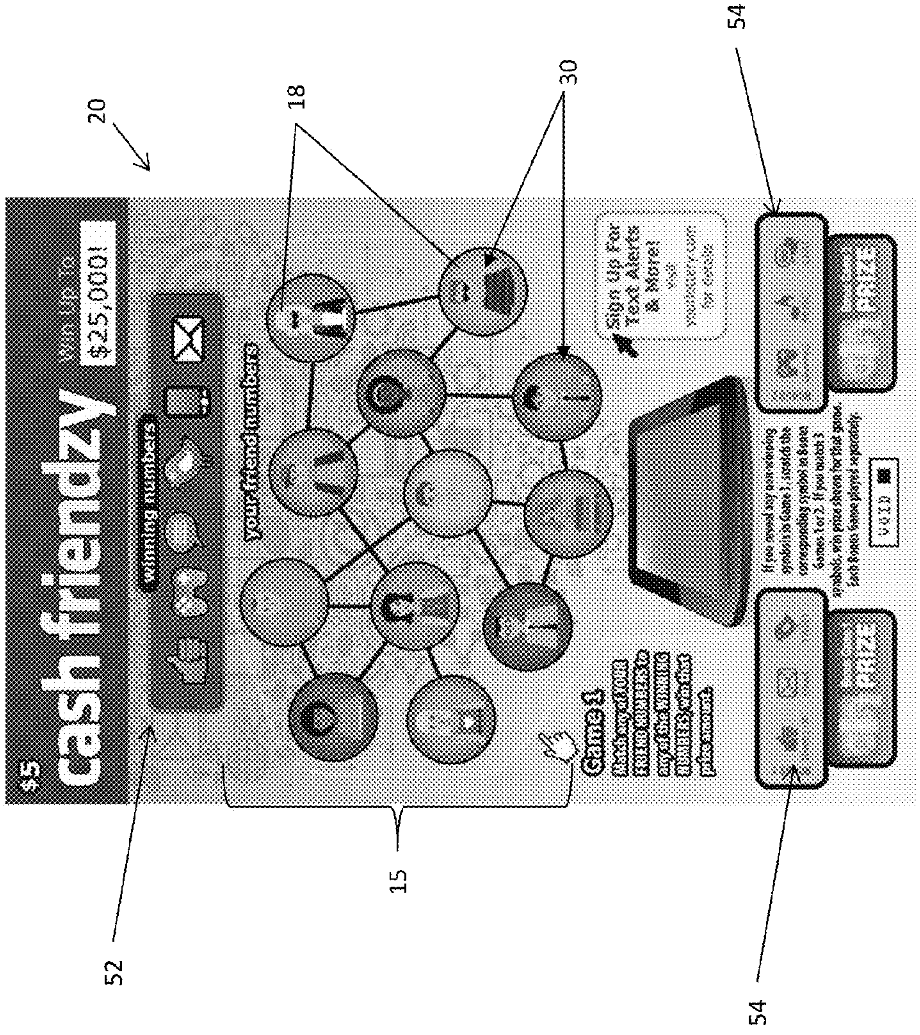
FIG. 3 illustrates an instant lottery game in accordance with one embodiment of the present invention.

As shown in FIGS. 1 through 3, for example, a matrix, grid or other arrangement 15 of player profiles is provided on a lottery ticket 20 according to embodiments of the present invention, whereby individual profile elements 18 can be used as wagering selections, similar to how a number might be selected for a lottery drawing or casino-style game. The player profile elements 18 can be a photograph inputted by a player, an avatar or other creation inputted by a player to the system, for example. Whether the player uses an avatar, a photographic image or other creation, the selected item can be referred to as a profile icon for purposes of the present disclosure. In one embodiment of the present invention, each player must opt-in in order for his or her player icon to be selected for the wagering matrix. Thus, there can be an initial pool of registered game players (such as indicated at 22 in FIG. 1), and a subset pool of opted-in players 24 as shown in FIGS. 1 and 2. In one embodiment of the present invention, a player must be registered to play, and only registered players can become eligible to opt in. Further, as part of the "opt in" process, players can decide what to use as their player profile icon, and can select and store a copy of one or more icons associated with the player and taken from a social media web site to which the user is a member, for example. Such information can be stored as part of the player's profile. Players have the ability to pull in any of a number of pre-determined profile icons from other social media sites which could include an actual photograph or avatar, or the player can create a new profile icon including an actual photographic image or avatar, for example.

Once the player registers, opts in and creates his/her player profile icon, the system can then randomly select player icons from the pool of opted-in players to be used in a specific game. In one embodiment of the present invention, a player can maintain multiple icons in his or her profile, and the system of the present invention can randomly select, or the player can specifically designate, which player icon is to be used in the pool available for selection into the game matrix or arrangement for a given game. It will be appreciated that a player icon grid made available for selection by the user for a particular game need not take a specific shape (e.g., rectangular, square, etc.) but can simply refer to any two-dimensional arrangement such that each grid has an individual grid location 30 corresponding to an individual player icon 18, as illustrated in FIGS. 1 through 3, for example. As further shown in the example illustrated in FIG. 2, the system randomly selects a number of "Lucky Friends" as at 35 who will be shown on the ticket for the game. The system can also randomly select a number of "Power Pals" 40 who will be shown on the ticket for the game. In one embodiment of one game according to the present invention, the player selects five player profiles from the Lucky Friends pool, as shown at 42 and one player profile from the Power Pals pool, as shown at 44. This corresponds to a "Pick5" type game plus a "Power Ball" extra pick, similar to some lottery drawing games. It will be appreciated that the game matrix can be based on any traditional numbers game, including daily numbers games, bi-weekly games, or Powerball™/Mega Millions™ style games.

The present invention can operate such that different profiles are selected for each game. Further, the present invention can operate to allow players to access and coordinate profile information using their profiles from other social media websites. In one embodiment of the present invention, in addition to potentially winning by playing the game, players can win by being selected by the system for the game pool. In a specific embodiment of the present invention, all players associated with player icons that are randomly selected for the pool of selectable icons receive a prize. Such an embodiment encourages participation by the eligible registered players. Players can also earn and accumulate loyalty points or prizes for being selected for the pool, being selected by other players during play of the game, referring others to the game and/or having the referred player(s) win a game.

FIG. 1 illustrates further processing in accordance with one aspect of the present invention. As shown therein, after the system has established a grid 15 of selectable profile icons 18, wherein each profile icon represents an individual participant, the grid and profile icons are made available to players for selection, such as in the form of a printed ticket or on a display of a computing device. In such an embodiment, the computing device can be any number of electronic devices having a processor executing instructions stored in a memory for operating the present invention, including such devices as personal computers, laptops, tablet computers and mobile communications devices. In one embodiment of the present invention, the system receives a request to play a game involving the selection of one or more of the selectable profile icons via a computing device, and in response to the request, the system cause the computing device to display the grid and selectable profile icons. Next, in this embodiment, the system receives a selection of one or more of the selectable profile icons, comprising the player-selected subset of icons 26 in FIG. 1. The game can be operated by the player selecting individual icons, or by the player requesting that the system of the present invention randomly select profile icons to comprise the subset 26. Once the selections are received and stored, the system can execute a game in accordance with this embodiment by conducting a drawing of one or more of the selectable profile icons (the "game-selected subset" of icons 28 in FIG. 1), and comparing the one or more drawn profile icons with the selected one or more profile icons as indicated at 29. In the electronic embodiment of the present invention, the system of the present invention can also send to the computing device the results of the drawing and an indication as to whether the player's selected profile icons correspond to a winning selection.

In conducting this embodiment of a game, the system of the present invention establishes the grid with multiple individual grid locations 30, and randomly selects multiple profile icons from the pool of available icon entries sufficient to populate the grid 15. As discussed above, it will be appreciated that at least one of the received selectable profile icon pool entries can be taken from a social networking data repository. In one embodiment of the present invention, the player can provide the system with an indication of a specifically desired profile icon to be highlighted for potential inclusion in the selected profile icons 26 for the player, in the event the desired profile icon is one of the selectable profile icons in the established grid. For example, if a player is friends with Jane Doe, and wishes to consider using Jane Doe's player icon, the player can inform the system of the present invention, which, upon randomly selecting the grid of icons for play, can determine if Jane Doe's icon has been selected, and can thereafter highlight or otherwise bring the player's attention to Jane Doe's icon in the field of selectable icons. In this way, the player's "favorite" icons can be designated and save the player time in trying to find the favorite icon(s) once the grid has been revealed.

It will thus be appreciated that the game according to one embodiment of the present invention can be operated by establishing a pool of available profile icons (e.g., icons corresponding to opted-in players); randomly selecting a first subset of the pool for displaying on a user interface as player-selectable profile icons (e.g., the grid of profile icons); and executing a first game by comparing a player-selected subset of the first subset with a randomly selected game subset of the first subset of profile icons. The game can further operate in future games to randomly select further subsets of the previously established pool for displaying on a user interface as player-selectable profile icons; and executing further games by comparing a player-selected subset of the further subsets with a randomly selected game subset of the subsequent subsets of profile icons. In this way, it will be appreciated that the game of the present invention does not include the same profile icons available for selection from game to game, which is in contrast to a traditional drawing-based game, whereby, for example, a set number of numbers (e.g., 1 to 59) are available for selection. Further, the first subset selected by the present invention for display to the user can be replaced into the pool prior to selecting additional subsets of the pool for future games. Thus, if a player icon is selected for one game, it is not removed from being available for selection in future games, according to one embodiment of the present invention. Additionally, if a player has indicated a favorite icon or icons to be included, the present invention can accommodate this by pre-populating a player's selections to include whichever favorite or desired icon(s) have been made available for selection in a given game.

The present invention also facilitates social aspects by permitting chat and group wagering. For example, in one embodiment, players are able to set up group wagers to increase their chances of winning An organizer of a group play can set the parameters of a group wager and invite other registered users to opt in on the wager. Players can decide how many players can be a part of the group wager and for how much money each player needs to pay. If a group bet wins, the players can decide how to split the money between all of the members as well as if any proceeds of the winnings will go to a charity, for example.

In one embodiment, the present invention can be implemented with a front-end user interface/link to social media sites such that the user can log in using social media site credentials in order to play. In another embodiment of the present invention, a back-end application programming interface (API) to social media sites is provided. In operation, the present invention can be provided so as to operate only for registered game/lottery players, following necessary jurisdictional requirements. A registered game player will have previously created an account containing, for example, identity information, contact information such as an e-mail address, and credentials such as a password in order to be able to log in and conduct future activities as a registered player. Optionally, the registered player can also enter other player profile details within his or her account, including playing preference information, notification preference information, one or more player icons (such as a photographic image or avatar, for example), and personal interest information such as hobbies, sports, music, food, animals and similar interests, for example. In one embodiment of the present invention, notification information can include a request to notify the player's preferred social media site that one of his or her friends or designated player icons has been involved in some type of event within game play, such as, for example, being selected as part of the grid of selectable icons, being selected by the random selection of winning icons, etc. A registered player can access and play a game according to the present invention by, for example, logging in to a dedicated website for game play, using log-in credentials specifically established for the game of the present invention. As an alternative example, the player can login to a dedicated website for game play in accordance with the present invention using his or her preferred social media network/profile, and the present invention can recognize the player as a registered player through his or her unique e-mail address and/or personal or profile information.

The game of the present invention can operate with traditional print tickets, tickets purchased and/or played over the Internet, and tickets purchased as part of a subscription. The game can further operate as part of an electronic instant ticket, a video lottery terminal game, a "play for fun" game with no monetary value, a game that awards credits or prizes instead of money, a mobile application game, a Bingo game, a slot game, a Keno game, a poker game, a game that is revealed on a monitor and other games.

FIG. 3 illustrates an embodiment of the present invention with instant ticket games. In FIG. 3, elements 18 from the grid 15 are provided as player profile icons, and the player can scratch off the covering (physically or virtually depending upon the embodiment) to reveal numbers or other icons. These revealed icons are then matched with the "winning" icons 52 to determine if the player wins, Elements 54 show items/icons that can be matched by the player icons to determine if the player wins in one or more bonus games.

Figure 4:
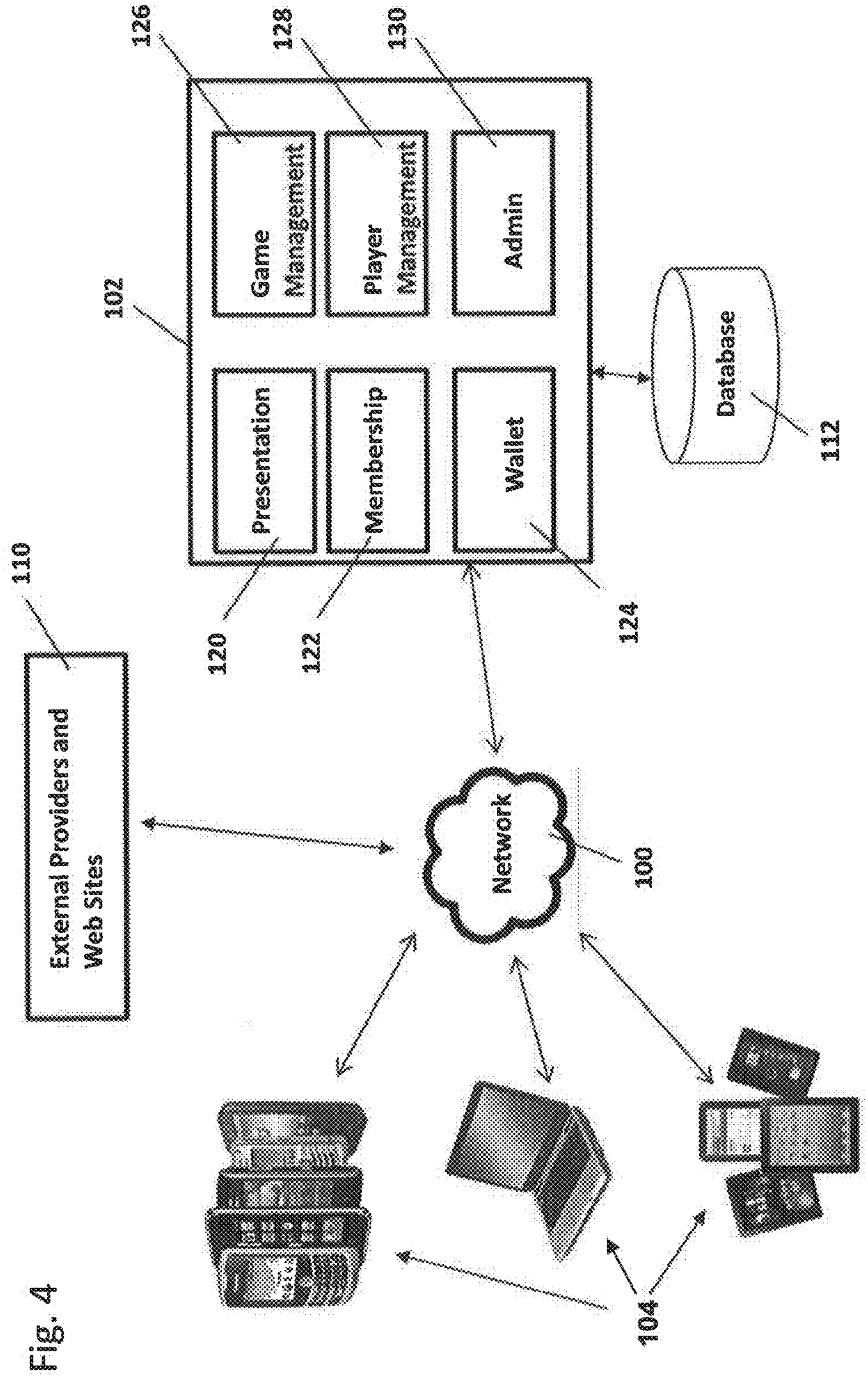
FIG. 4 is a schematic diagram illustrating an exemplary system for facilitating lottery-type games in accordance with one embodiment of the present invention.

FIG. 4 is a schematic diagram illustrating an exemplary system 102 for facilitating lottery-type games in accordance with an online embodiment of the present invention.

In the exemplary embodiment shown in FIG. 4, the present invention can comprise a computer-based system 102, where the components can be implemented in hardware, software, firmware, or combinations thereof. FIG. 4 illustrates an exemplary high-level network 100 with exemplary users and/or external computer systems 104 that can interact with the system 102 of the present invention. The users can access the system of the present invention using client computing devices 104, such as desktop computers, laptop computers, mobile communications devices (MCDs), smart television appliances or one or more public game terminals or kiosks in appropriate commercial sites, subject to any jurisdictional limitations, for example. It will be appreciated that the system of the present invention can incorporate necessary processing power and memory for storing data and programming that can be employed by the processor to carry out the functions and communications necessary to facilitate the processes and functionalities described herein.

Players can enter commands and information into the computer through a user interface including traditional input mechanisms, such as a keyboard and pointing device, commonly referred to as a mouse, trackball or touch pad. Other input devices can include, for example, a microphone, joystick, game pad, satellite dish, scanner, voice recognition device, keyboard, touch screen, toggle switch, pushbutton, or the like. One or more monitors or display devices can be provided with the player's computing device or game terminal as will be understood in the art. In addition to display devices, the computing devices can also include other peripheral output devices, which may be connected through an output peripheral interface. The computers implementing the invention may operate in a networked environment using logical connections to one or more remote computers, the remote computers typically including many or all of the elements described above.

As further shown in FIG. 4, the system 102 can include a presentation or user interface component 120, a player membership component 122, a player wallet component 124, a game management component 126, a player management component 128 and an administrative component 130, and further can be coupled to one or more databases 112 and/or other data sources. These software components can be programmed or configured to communicate with one another or with the data-storage modules. The system can run these software modules to facilitate the lottery-type games in accordance with embodiments of the present invention as described. The database 112 holds records related to players and games, including winning combinations, player selections, player opt-in permissions and other information. In one embodiment of the present invention, the system of the present invention is in communication with external service providers and web sites 110, such as banking service providers who may provide credit or payment transaction services for players, and social media sites that may provide access to player profile information and/or player personal network information.

Each of the client computing devices 104 can communicate with the system 102 via a user interface presentation component 120. The presentation component 120 provides computer and/or Internet access for players and game operators/administrators to communicate with the other components. The player membership component 122 performs functions related to registering new players, such as verifying player information, assigning player IDs, and creating player records. The wallet component 124 manages player accounts and handling debit and credit transactions against the player accounts, including wagering and winner payouts. The game management component 126 performs functions such as scheduling and conducting lottery drawings, selecting player profiles for production in connection with a given game, generating and publishing game results, and calculating payout amounts. The player management component 128 contains and manages data records related to each player, including, for example, player identification data, registration information, wager preferences, account history, social network information and opt-in information. The administrative component 130 facilitates administrative and customer service tasks to be performed by a system operator, for example. The administrative component can further provide API's such as a back-end application programming interface to social media sites, for example.

Unless otherwise stated, devices or components of the present invention that are in communication with each other do not need to be in continuous communication with each other. Further, devices or components in communication with other devices or components can communicate directly or indirectly through one or more intermediate devices, components or other intermediaries. Further, descriptions of embodiments of the present invention herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media. At a minimum, the memory includes at least one set of instructions that is either permanently or temporarily stored. The processor executes the instructions that are stored in order to process data. The set of instructions can include various instructions that perform a particular task or tasks. Such a set of instructions for performing a particular task can be characterized as a program, software program, software, engine, module, component, mechanism, or tool. Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions associated with the present invention to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, satellite, EDGE and EVDO, for example. Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present invention, as will be understood to one of ordinary skill in the art.

The present disclosure describes numerous embodiments of the present invention, and these embodiments are presented for illustrative purposes only. These embodiments are described in sufficient detail to enable those skilled in the art to practice the invention, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by way of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

The invention claimed is:

1. A method for operating a gaming system, comprising the steps of:

causing at least one processor to execute a plurality of instructions stored in at least one memory device to establish a profile icon pool containing a plurality of profile icon pool entries, wherein the pool includes a profile icon entry identifying a player wagering on the game, and randomly select a subset of the plurality of profile icon pool entries from the profile icon pool sufficient to populate a grid of player-selectable profile icons, wherein each profile icon electronically represents an individual participant, and wherein the player wagering on the game is an individual participant, with the grid and profile icons being displayable on a display of a computing device;

receiving a request from the player to play a game involving the selection of one or more of the selectable profile icons;

in response to the request, causing at least one computing device to display the grid and player-selectable profile icons;

receiving a selection of one or more of the selectable profile icons from the player; and executing a game by conducting a drawing of one or more of the selectable profile icons so as to establish one or more drawn profile icons, and comparing the one or more drawn profile icons with the selected one or more profile icons.

2. The method of claim 1, wherein each selectable profile icon comprises one of: an avatar; a photographic image.

3. The method of claim 1, wherein the step of causing at least one processor to establish a profile icon pool includes receiving a plurality of profile icon pool entries from respective individual participants prior to randomly selecting the subset.

4. The method of claim 1 wherein at least one of the received selectable profile icon pool entries is taken from a social networking data repository.

5. The method of claim 1, including the further step of sending to the at least one computing device the results of the drawing and an indication as to whether the selected profile icons correspond to a winning selection.

6. The method of claim 1 wherein the step of receiving a selection of one or more of the selectable profile icons includes receiving a request to randomly select one or more profile icons from the grid.

7. The method of claim 3 including the step of receiving an opt-in request from an individual prior to receiving a profile icon pool entry from said individual.

8. The method of claim 1 further including the step of receiving from a player an indication of a desired profile icon to be highlighted for potential selection by the player from within the subset.

9. The method of claim 3 including the step of issuing a prize to each participant represented by the profile icons used to establish the grid.

10. A system for operating a game, comprising:

at least one processor;

a plurality of instructions stored in at least one memory device and executable by the at least one processor to:

establish a profile icon pool containing a plurality of profile icon pool entries, wherein the pool includes a profile icon entry identifying a player wagering on the game;

randomly select a subset of the plurality of profile icon pool entries from the profile icon pool sufficient to populate a grid of player-selectable profile icons, wherein each profile icon electronically represents an individual participant, and wherein the player wagering on the game is an individual participant, with the grid and profile icons being displayable on a display of a computing device;

receive a request from the player to play a game involving the selection of one or more of the player-selectable profile icons;

in response to the request, cause at least one computing device to display the grid and player-selectable profile icons;

receive a selection of one or more of the selectable profile icons from the player; and execute a game by conducting a drawing of one or more of the selectable profile icons so as to establish one or more drawn profile icons, and comparing the one or more drawn profile icons with the selected one or more profile icons.

11. The system of claim 10 wherein establishing a profile icon pool includes receiving a plurality of profile icon pool entries from respective individual participants prior to randomly selecting the subset.

12. The system of claim 11 wherein at least one of the profile icon pool entries is taken from a social networking data repository.

* * * * *